(12) United States Patent
Jee et al.

(10) Patent No.: US 10,278,033 B2
(45) Date of Patent: Apr. 30, 2019

(54) ELECTRONIC DEVICE AND METHOD OF PROVIDING MESSAGE VIA ELECTRONIC DEVICE

(71) Applicant: Samsung Electronics Co., Ltd, Gyeonggi-do (KR)

(72) Inventors: Jeong-wun Jee, Gyeonggi-do (KR); Yun-sun Baek, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/194,406

(22) Filed: Jun. 27, 2016

(65) Prior Publication Data
US 2016/0381527 A1 Dec. 29, 2016

(30) Foreign Application Priority Data
Jun. 26, 2015 (KR) ........................ 10-2015-0091391

(51) Int. Cl.
*H04W 4/10* (2009.01)
*H04W 4/20* (2018.01)
*H04W 4/00* (2018.01)
*H04W 4/21* (2018.01)
*H04W 4/50* (2018.01)

(52) U.S. Cl.
CPC ............... *H04W 4/10* (2013.01); *H04W 4/21* (2018.02); *H04W 4/50* (2018.02)

(58) Field of Classification Search
CPC ........ H04W 4/10; H04W 4/001; H04W 4/206
See application file for complete search history.

(56) References Cited

U.S. PATENT DOCUMENTS

| | | | | |
|---|---|---|---|---|
| 5,631,950 A | * | 5/1997 | Brown | H04M 11/08 379/106.01 |
| 5,692,093 A | * | 11/1997 | Iggulden | G11B 15/023 348/E7.091 |
| 5,696,866 A | * | 12/1997 | Iggulden | G11B 15/023 348/E7.091 |
| 5,877,698 A | * | 3/1999 | Kusnier | G09F 25/00 340/286.01 |
| 7,174,007 B1 | * | 2/2007 | Cannon | H04M 1/578 379/127.01 |
| 7,463,723 B2 | * | 12/2008 | Davis | H04M 3/53308 379/201.1 |
| 7,536,180 B2 | | 5/2009 | Yoon et al. | |
| 2005/0210394 A1 | * | 9/2005 | Crandall | H04L 12/1831 715/752 |
| 2006/0031582 A1 | * | 2/2006 | Pugel | H04L 12/1895 709/246 |
| 2006/0095575 A1 | * | 5/2006 | Sureka | H04L 12/1822 709/227 |
| 2008/0215323 A1 | * | 9/2008 | Shaffer | H04M 3/5335 704/246 |

(Continued)

*Primary Examiner* — Bobbak Safaipour

(57) ABSTRACT

Provided is a method of providing a message via an electronic device, including: executing an application that provides messages, which correspond to a plurality of users in a group, as a voice; acquiring a signal for selecting at least one user from the group; generating a voice stream by reconstructing at least one message corresponding to the at least one user based on the acquired signal and the messages corresponding to the plurality of users; and outputting the voice stream.

16 Claims, 17 Drawing Sheets

(56) References Cited

U.S. PATENT DOCUMENTS

| | | | |
|---|---|---|---|
| 2010/0048235 A1* | 2/2010 | Dai | G11B 27/105 455/518 |
| 2011/0153330 A1* | 6/2011 | Yazdani | G10L 13/00 704/260 |
| 2012/0162350 A1* | 6/2012 | Lee | H04L 51/08 348/14.03 |
| 2013/0322439 A1* | 12/2013 | Verhallen | H04J 3/12 370/389 |
| 2014/0153410 A1* | 6/2014 | Harris | H04L 65/605 370/252 |
| 2014/0278404 A1* | 9/2014 | Holmes | G10L 15/265 704/235 |
| 2015/0023224 A1* | 1/2015 | Cosky | G07F 17/32 370/260 |
| 2017/0142036 A1* | 5/2017 | Li | G06F 17/2765 |
| 2017/0237853 A1* | 8/2017 | Miller | H04L 12/1818 455/563 |

* cited by examiner

FIG. 11A

TEAM HEAD — SILENT — WE NEED TO SCHEDULE QUARTERLY COMPANY DINNER. IF YOU HAVE ANY IDEA, PLEASE LET ME KNOW — SILENT — ANY OTHER IDEAS? — SILENT — BECAUSE ALL OF YOU SEEM TO AGREE ON THIS, QUARTERLY COMPANY DINNER WILL BE AT KOREAN RESTAURANT OOO, 7 PM ON DAY PROJECT FINISHES.

TEAM
HEAD  SILENT  WE NEED TO SCHEDULE QUARTERLY  SILENT  BECAUSE ALL OF YOU SEEM TO AGREE ON THIS,
                COMPANY DINNER. IF YOU HAVE                QUARTERLY COMPANY DINNER WILL BE
                ANY IDEA, PLEASE LET ME KNOW.              AT KOREAN RESTAURANT OOO,
                                                           7 PM ON DAY PROJECT FINISHES.
901   1114      910                          1115         950

ELECTRONIC DEVICE AND METHOD OF PROVIDING MESSAGE VIA ELECTRONIC DEVICE

CROSS-REFERENCE TO RELATED APPLICATION(S) AND CLAIM OF PRIORITY

The present application is related to and claims the benefit of Korean Patent Application No. 10-2015-0091391, filed on Jun. 26, 2015, in the Korean Intellectual Property Office, the disclosure of which is incorporated herein in its entirety by reference.

TECHNICAL FIELD

The present disclosure relates to electronic devices and methods of providing messages via the electronic devices.

BACKGROUND

A Push to Talk (PTT) service is a walkie-talkie type service that uses a mobile phone like a walkie-talkie and permits one person to talk on his or her mobile phone and many people to listen to the person simultaneously through a single press of a button. In other words, the PTT service allows simple, instant communication by enabling users to speak with a single push of a button, and provides a faster communication solution than in the case of normal mobile phones having a long waiting time.

Thus, in services that provide users with messages, such as PTT services, there is a need for an electronic device and a method of providing a message via the electronic device, which are capable of efficiently providing a message to a user.

SUMMARY

To address the above-discussed deficiencies, it is a primary object to provide electronic devices and methods of providing messages via the electronic devices, whereby the messages may be efficiently transmitted to a user by reconstructing messages stored in or received by the electronic devices.

Provided also are electronic devices and methods of providing messages via the electronic devices, whereby a user can easily identify the content of a message and a person who transmits the message by only listening to the message.

Provided also are electronic devices and methods of providing messages via the electronic devices, whereby a user may be provided only with necessary messages by selectively providing a message via the electronic devices.

Provided also is a non-transitory computer-readable recording medium having recorded thereon a program for executing a method of providing a message via an electronic device on a computer.

Additional aspects will be set forth in part in the description which follows and, in part, will be apparent from the description, or may be learned by practice of the presented embodiments.

According to an aspect of an embodiment, a method of providing a message via an electronic device includes executing an application that provides messages, which correspond to a plurality of users in a group, as a voice; acquiring a signal for selecting at least one user from the group; generating a voice stream by reconstructing at least one message corresponding to the at least one user based on the acquired signal and the messages corresponding to the plurality of users; and outputting the voice stream.

The generating of the voice stream comprises: extracting the at least one message corresponding to the at least one user among the messages corresponding to the plurality of users; extracting identification (ID) information of the at least one user among pieces of ID information of the plurality of users; and generating the voice stream by inserting the ID information of the at least one user into the at least one message corresponding to the at least one user.

When the at least one message corresponding to the at least one user is a plurality of messages, the generating of the voice stream comprises generating the voice stream by inserting a silent interval between the plurality of messages.

When the at least one message corresponding to the at least one user comprises successive messages, the voice stream is generated by inserting the ID information of the at least one user into a starting message among the successive messages.

The method further comprises receiving the messages corresponding to the plurality of users and the pieces of ID information of the plurality of users, wherein the pieces of ID information of the plurality of users are pieces of information respectively indicating names or IDs of the plurality of users.

The at least one message corresponding to the at least one user is acquired within a predetermined time interval.

The predetermined time interval is at least one of a time interval from an end time point when execution of the application ends to a start time point when the execution of the application starts after the end time point and a time interval corresponding to unconfirmed messages from among the messages corresponding to the plurality of users A type of the at least one message corresponding to the at least one user and the ID information of the at least one user is at least one of text data and voice data, the method further comprising, when the type of the at least one message corresponding to the at least one user and the ID information of the at least one user is the text data, converting the text data into the voice data.

The method further comprises acquiring a search term, wherein the generating of the voice stream comprises generating the voice stream by reconstructing the at least one message corresponding to the at least one user based on the signal, the acquired search term, and the messages corresponding to the plurality of users.

The method further comprises storing the messages corresponding to the plurality of users and the pieces of ID information of the plurality of users.

The acquiring of the signal for selecting the at least one user from the group comprises acquiring the signal for selecting the at least one user via a user interface of the electronic device.

According to an aspect of another embodiment, an electronic device comprising: a controller configured to execute an application that provides messages, which correspond to a plurality of users in a group, as a voice and generate a voice stream by reconstructing at least one message corresponding to at least one user based on a signal for selecting the at least one user from the group and the messages corresponding to the plurality of users; and an output unit configured to output the generated voice stream.

The controller is further configured to extract the at least one message corresponding to the at least one user among the messages corresponding to the plurality of users, extract identification (ID) information of the at least one user among pieces of ID information of the plurality of users, and generate the voice stream by inserting the ID information of the at least one user into the at least one message corresponding to the at least one user.

When the at least one message corresponding to the at least one user is a plurality of messages, the generating of the voice stream comprises generating the voice stream by inserting a silent interval between the plurality of messages.

When the at least one message corresponding to the at least one user comprises successive messages, the controller is further configured to generate the voice stream by inserting the ID information of the at least one user into a starting message among the successive messages.

The electronic device further comprises a communication unit configured to receive the messages corresponding to the plurality of users and the pieces of ID information of the plurality of users, wherein the pieces of ID information of the plurality of users are pieces of information respectively indicating names or IDs of the plurality of users.

A type of the at least one message corresponding to the at least one user and the ID information of the at least one user is at least one of text data and voice data, and wherein, when the type of the at least one message corresponding to the at least one user and the ID information of the at least one user is the text data, the controller is further configured to convert the text data into the voice data.

The controller is further configured to acquire a search term and generate the voice stream by reconstructing the at least one message corresponding to the at least one user based on the signal, the acquired search term, and the messages corresponding to the plurality of users.

The electronic device further comprises: a memory configured to store the messages corresponding to the plurality of users and the pieces of ID information of the plurality of users; and a user interface configured to acquire the signal for selecting the at least one user.

According to an aspect of another embodiment, a non-transitory computer-readable recording medium having recorded thereon a program for executing a method of providing a message via an electronic device on a computer, the method comprising: executing an application that provides messages, which correspond to a plurality of users in a group, as a voice; acquiring a signal for selecting at least one user from the group; generating a voice stream by reconstructing at least one message corresponding to the at least one user based on the acquired signal and the messages corresponding to the plurality of users; and outputting the voice stream.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11A illustrates a voice stream output from an electronic device, according to various embodiments of the present disclosure;

FIG. 11B illustrates a voice stream output from an electronic device, according to various embodiments of the present disclosure.

DETAILED DESCRIPTION

Figure 1:
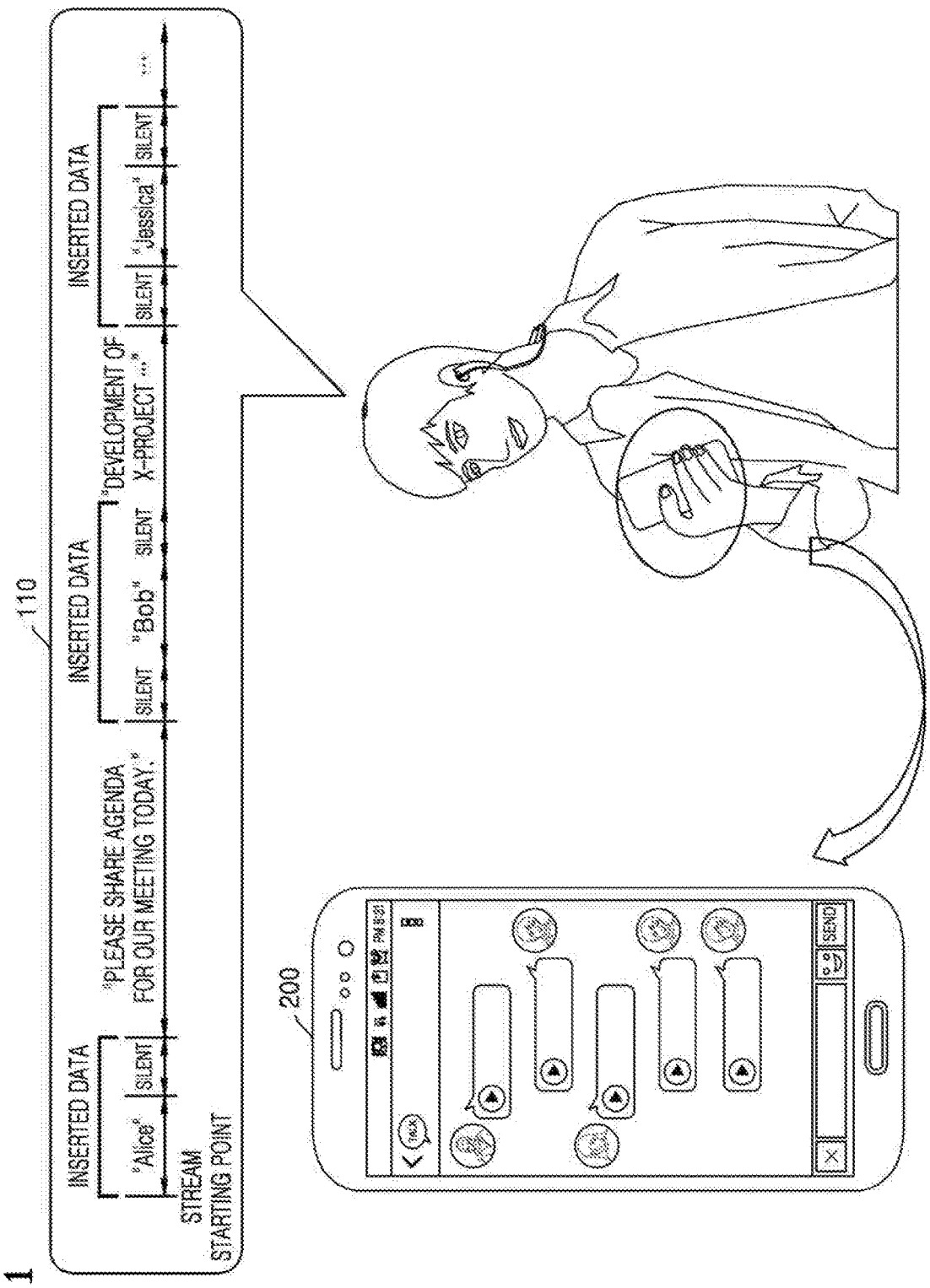
FIG. 1 illustrates a method of providing a message via an electronic device, according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the terms used in the specification will be briefly described, and then the present invention will be described in detail.

The terms used in this specification are those general terms currently widely used in the art in consideration of functions regarding the present invention, but the terms may vary according to the intention of those of ordinary skill in the art, precedents, or new technology in the art. Also, specified terms may be selected by the applicant, and in this case, the detailed meaning thereof will be described in the detailed description of the invention. Thus, the terms used in the specification should be understood not as simple names but based on the meaning of the terms and the overall description of the invention.

When a part "includes" or "comprises" an element, unless there is a particular description contrary thereto, the part can further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

It will be understood that, although the terms "first", "second", etc. may be used herein to describe various elements, these elements should not be limited by these terms. These terms are only used to distinguish one element from another element. Thus, a first element discussed below could be termed a second element, and similarly, a second element could be termed a first element, without departing from the scope of embodiments. As used herein, the term "and/or" includes any and all combinations of one or more of the associated listed items. Expressions such as "at least one of," when preceding a list of elements, modify the entire list of elements and do not modify the individual elements of the list.

Throughout the specification, an "electronic device" refers to a device that is supplied with an electrical energy to operate. Although the electronic device is described as being a "terminal" herein, it will be understood by those of ordinary skill in the art that the electronic device is not limited to the terminal and may be any of devices that operate on an electrical energy.

As used herein, a "message" means the content that a user transmits to the other party via an electronic device by using a messaging service (e.g., a Push to Talk (PTT) service, etc.). Furthermore, the message may include a message that the other party transmits to the user via an electronic device by using a messaging service. In addition, throughout the specification, "a message corresponding to a user" may be a message transmitted or received by the user.

Throughout the specification, an "application" means software that runs on an operating system (OS) of an electronic device. The application is one of a plurality of applications installed on the electronic device and may be distributed through an application store or market.

As used herein, a "stream" refers to an ordered sequence of data items that are being transmitted or received in streaming data sets. A "voice stream" means a sequence of voice data.

Reference will now be made in detail to embodiments, examples of which are illustrated in the accompanying drawings. In this regard, the present embodiments may have different forms and should not be construed as being limited to the descriptions set forth herein.

FIG. 1 is a conceptual diagram for explaining a method of providing a message via an electronic device 200, according to an embodiment.

A user may exchange messages with an individual or a group of individuals by using a messaging service supported by the electronic device 200. In this case, a messaging service may mean a service that allows a user to transmit or receive a message via data communications. For example, the messaging service may be a PTT service, but is not limited thereto.

The electronic device 200 may store in real-time messages transmitted and received between a user and an individual or group via a messaging service. Furthermore, the electronic device 200 may store the messages during the absence of the user. In this case, the electronic device 200 may receive messages from an external device. Here, the external device may be a server or the electronic device 200 held by another user who exchanges messages with the user.

As shown in FIG. 1, the user may listen to messages corresponding to a plurality of users in a group by reconstructing the messages into a voice stream 110.

In other words, the electronic device 200 may generate the voice stream 110 by reconstructing all or some of the messages corresponding to the plurality of users in the group. The electronic device 200 may generate the voice stream 110 by reconstructing only messages corresponding to selected some of the plurality of users. The electronic device 200 may insert identification (ID) information for the user to identify a person who transmits a message by only listening to the voice stream 110. Furthermore, when generating the voice stream 110 based on the plurality of messages, the electronic device 200 may insert a silent interval between the plurality of messages in order to prevent continuous connection between the plurality of messages.

In addition, while FIG. 1 shows that the electronic device 200 is a smartphone, the electronic device 200 may be implemented as various other types of devices. The electronic device 200 may be a handheld device, such as a personal digital assistant (PDA), a tablet personal computer (PC), an earphone, an MP3 player, a smart wristwatch, etc.

Figure 2:
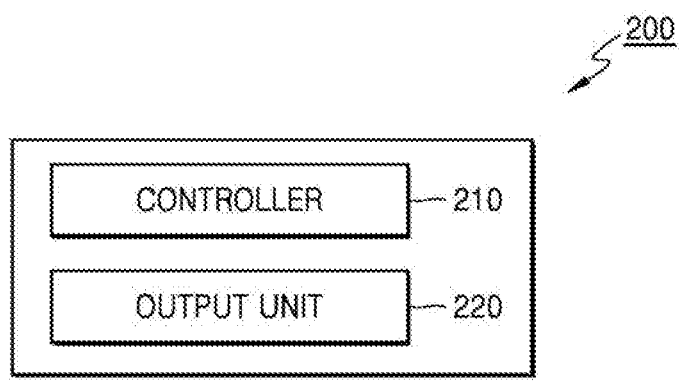
FIG. 2 illustrates a configuration of an electronic device according to an embodiment.

FIG. 2 is a block diagram of a configuration of an electronic device 200 according to an embodiment.

According to an embodiment, the electronic device 200 may include a controller 210 and an output unit 220. The electronic device 200 may include more or fewer components than those shown in FIG. 2.

The controller 210 may execute an application that provides messages, which correspond to a plurality of users in a group, as a voice. In this case, the messages corresponding to the plurality of users may be the content of conversations transmitted or received between the plurality of users in the group. A type of a message may be text data or voice data.

The controller 210 may reconstruct, based on a signal for selecting at least one user from a group and messages corresponding to a plurality of users in the group, at least one message corresponding to the at least one user. The controller 210 may also generate a voice stream based on the reconstructed at least one message. In this case, the at least one message corresponding to the at least one user may be acquired within a predetermined time interval. For example, the predetermined time interval may be a duration from an end time point when execution of an application ends to a start time point when execution of the application starts again after the end time point. In other words, since the user is not able to receive messages exchanged within the group in his or her absence, the electronic device 200 may reconstruct messages exchanged within the group during the absence of the user and generate a voice stream based on the reconstructed messages.

In addition, even during execution of the application, there may be unconfirmed messages among the messages corresponding to the plurality of users. Thus, the predetermined time interval may be a time interval corresponding to the unconfirmed messages.

Furthermore, during execution of the application, the messages corresponding to the plurality of users may need to be reconfirmed. It will be understood by those of ordinary skill in the art that the predetermined time interval may be a time interval arbitrarily set by the user.

The controller 210 may generate voice streams by reconstructing messages corresponding to all or some of the plurality of users in the group. In this case, messages corresponding to all of the plurality of users may be messages exchanged between the plurality of users. Furthermore, messages corresponding to some of the plurality of users may be messages exchanged between them. For example, a message corresponding to a first user may be a message that is transmitted by the first user to other users or received by the first user from the other users. Furthermore, the controller 210 may generate a voice stream according to the time when messages corresponding to all or some of the plurality of users are received.

The controller 210 may extract, based on a signal for selecting at least one user from the group, at least one message corresponding to the at least one user among messages corresponding to the plurality of users. For example, if first through fifth users form the group, the controller 210 may acquire a signal for selecting the second and third users. The controller 210 may then extract a message transmitted by the second user to other users and a message transmitted by the third user to other users among messages exchanged within the group.

The controller 210 may extract, based on a signal for selecting at least one user from the group, ID information of the at least one user among pieces of ID information of the plurality of users. In this case, ID information is used to distinguish the plurality of users from one another. For example, the pieces of ID information of the plurality of users may be pieces of information respectively indicating names or IDs of the plurality of users.

The controller 210 may insert ID information of at least one user into at least one message corresponding to the at least one user. The controller 210 may generate a voice stream based on the at least one message having the ID information inserted therein. Thus, a voice stream having ID information of at least one user inserted therein is output so that a user may identify a person who transmits a message by only listening to the voice stream.

If at least one message corresponding to at least one user is a plurality of messages, the controller 210 may insert silent intervals between the plurality of messages to generate a voice stream. For example, when messages respectively correspond to the second and third users, a silent interval may be inserted between the messages so as to prevent continuous connection between the messages. In this case, the silent interval may be in a range of about 20 ms to about 40 ms. The silent interval may be set so that a front portion of the voice stream may be distinguished from a rear portion thereof.

If at least one message corresponding to at least one user includes successive messages, the controller 210 may generate a voice stream by inserting ID information of the at least one user into a starting message among the successive messages. In this case, the successive messages mean a sequence of messages corresponding to the same user while not including a message corresponding to another user. It is assumed herein that the successive messages are first through third messages corresponding to the first user. The controller 210 may insert ID information of the first user only at the front of the first message and not at the front of the second and third messages. By inserting ID information of a user only into a starting message, the electronic device 100 may reduce the amount of unnecessary data for efficient transmission of a message.

In addition, the types of messages corresponding to a plurality of users and pieces of ID information of the plurality of users may be at least one of text data and voice data, and it will be understood by those of ordinary skill in the art that other types of messages and ID information may be used.

When the type of a message corresponding to an ID information of at least one user is text data, the controller 210 may convert text data into voice data.

Furthermore, the controller 210 may acquire a search term and generate a voice stream by reconstructing at least one message corresponding to at least one user based on the search term and messages corresponding to a plurality of users. The controller 210 may extract only a message related to the search term among the at least one message corresponding to the at least one user and reconstruct the extracted message into a voice stream.

The output unit 220 may output the voice stream. The output unit 220 may be a speaker or buzzer, but is not limited thereto.

The electronic device 200 may further include a communication unit (not shown), a memory (not shown), and a user interface (not shown). The communication unit may receive messages corresponding to a plurality of users and pieces of ID information of the plurality of users from an external device. In this case, the external device may be a server and the electronic device 200 corresponding to each of the plurality of users. The controller 210 may control the communication unit to receive the messages corresponding to the plurality of users and the pieces of ID information of the plurality of users from an external device via a wireless network.

In the absence of a user or when the electronic device 200 ceases to operate, a server may store messages exchanged between a plurality of users in a group. The controller 210 may execute an application and receive messages exchanged between the plurality of users from the server via the communication unit. Furthermore, the controller 210 may execute an application and control the communication unit to receive messages exchanged between the plurality of users in the group via the application.

In addition, examples of a wireless network may include, but are not limited to, a wireless local area network (WLAN), Wi-Fi, BLUETOOTH, ZIGBEE, Wi-Fi Direct (WFD), Ultra Wideband (UWB), Infrared Data Association (IrDA), BLUETOOTH Low Energy (BLE), and Near Field Communication (NFC).

The memory may store messages corresponding to a plurality of users and pieces of ID information of the plurality of users. The memory may include at least one storage medium from among a flash memory-type memory, a hard disk-type memory, a multimedia card micro-type memory, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The user interface may acquire a signal for selecting at least one user or a search term. The user interface may mean a device via which at least one user is selected from among a plurality of users in a group, or a search term is input. The user interface may include hardware components, such as a keypad, a mouse, a touch panel, a touch screen, a track ball, and a jog switch, but is not limited thereto.

The electronic device 200 may generate a voice stream after inserting pieces of ID information of a plurality of users respectively corresponding to a plurality of messages into the plurality of messages, thereby allowing a user to identify the content of a message and a person who transmits the message by only listening to the voice stream.

Furthermore, by selecting at least one user from among a plurality of users in a group, the electronic device 200 may provide a voice stream so that a user may selectively listen to a message.

The electronic device 200 may include a central arithmetic processor that controls overall operations of the controller 210, the output unit 220, the communication unit, the memory, and the user interface. The central arithmetic processor may be implemented as an array of a plurality of logic gates or a combination of a general purpose microprocessor and a program that can be run on the general purpose microprocessor. Furthermore, it will be appreciated by those of ordinary skill in the art to which the present embodiment pertains that the central arithmetic processor may be formed by different types of hardware.

Hereinafter, various operations performed by the electronic device 200 and applications thereof will be described in detail. Although none of the controller 210, the output unit 220, the communication unit, the memory, and the user interface are specified, features and aspects that would be clearly understood by and are obvious to those of ordinary skill in the art may be considered as a typical implementation. The scope of the present inventive concept is not limited by a name of a particular component or physical/logical structure.

Figure 3:
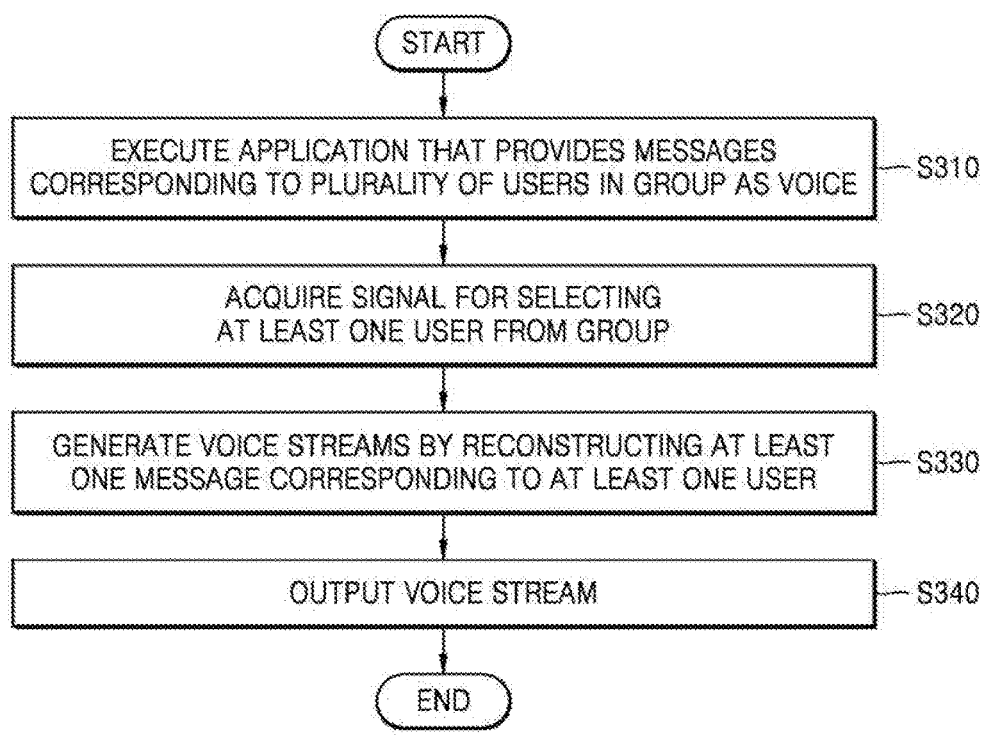
FIG. 3 illustrates a method, performed by an electronic device, of providing a message, according to various embodiments of the present disclosure.

FIG. 3 is a flowchart of a method, performed by the electronic device 200, of providing a message, according to an embodiment.

Referring to FIG. 3, the electronic device 200 executes an application that provides messages corresponding to a plurality of users in a group as a voice (S310). In this case, the messages corresponding to the plurality of users may be the content of conversations transmitted or received between the plurality of users in the group. The type of a message may be text data or voice data.

The electronic device 200 acquires a signal for selecting at least one user from the group (S320). The electronic device 200 may acquire a signal for selecting at least user from the group in order to provide all or some of conversations within the group.

Figure 4:
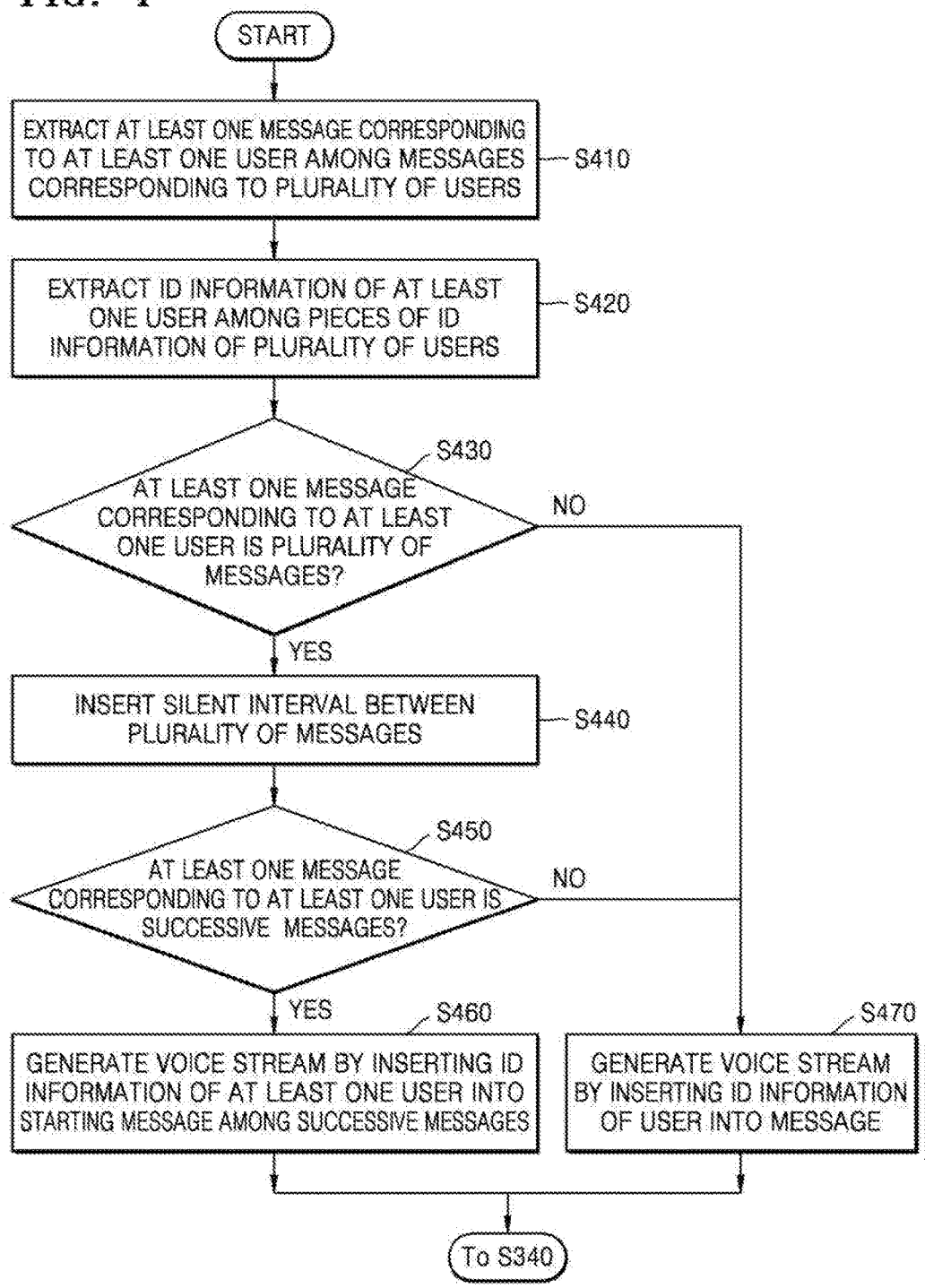
FIG. 4 illustrates a method, performed by an electronic device, of reconstructing a message into a voice stream, according to various embodiments of the present disclosure.

The electronic device 200 generates voice streams by reconstructing at least one message corresponding to the at least one user (S330). If a signal for selecting all of the plurality of users in the group is acquired, the electronic device 200 may generate voice streams based on the messages corresponding to the plurality of users. Furthermore, if a signal for selecting some of the plurality of users in the group is acquired, the electronic device 200 may generate voice streams based on messages corresponding to the some of the plurality of users. FIG. 4 is flowchart for explaining operation S330, performed by the electronic device 200, of generating voice streams by reconstructing at least one message corresponding to at least one user, according to an embodiment. FIG. 4 illustrates merely an example of operation S330, and it will be appreciated by those of ordinary skill in the art that voice streams may be generated using other methods.

Referring to FIG. 4, the electronic device 200 may extract at least one message corresponding to at least one user among the messages corresponding to the plurality of users, i.e., first through fifth users (S410). For example, if a signal for selecting a first user from among the plurality of users (the first through fifth users) is acquired, the electronic device 200 may extract, among all the messages exchanged within the group, first through third messages transmitted by the first user to other users.

The electronic device 200 may extract ID information of the at least one user among pieces of ID information of the plurality of users (S420). Here, the pieces of ID information of the plurality of users may be pieces of information respectively indicating names or IDs of the plurality of users. The electronic device 200 may extract ID information of the first user among the pieces of ID information of the plurality of users (the first through fifth users).

The electronic device 200 may determine whether the at least one message corresponding to the at least one user is a plurality of messages (S430). For example, if the first and second users are selected from among the plurality of users (the first through fifth users), the electronic device 200 may determine whether at least one message corresponding to the first user is a plurality of messages and whether at least one message corresponding to the second user is a plurality of messages.

If the at least one message is a plurality of messages in operation S430, the electronic device 200 performs operation S440. Furthermore, if the at least one message is not a plurality of messages, the electronic device 200 performs operation S470.

The electronic device 200 inserts a silent interval between the plurality of messages (S440). For example, the electronic device 200 may insert a silent interval between first and second messages in order to prevent the first and second messages from being continuously connected to each other, as will be described in more detail below with reference to FIG. 7A.

The electronic device 200 may determine whether the at least one message corresponding to the at least one user is successive messages (S450). The successive messages mean a sequence of messages corresponding to the same user while not including a message corresponding to another user. If the at least one message is successive messages, the electronic device 200 performs operation S460. Furthermore, if the at least one message is not successive messages, the electronic device 200 performs operation S470.

The electronic device 200 generates voice streams by inserting ID information of the at least one user into a starting message among the successive messages (S460). For example, if there are successive messages (first through third messages) corresponding to the first user, the electronic device 200 may insert ID information of the first user into the first message when generating the voice stream based on the first through third messages. In this case, the ID information of the first user may be a name of the first user. Operation S460 will be described in more detail below with reference to FIG. 7B.

The electronic device 200 may generate voice streams by inserting ID information of the at least one user into the at least one message (S470). For example, it is assumed herein that a first message corresponding to the first user, a second message corresponding to the second user, a third message corresponding to the first user, a fourth message corresponding to the third user, and a fifth message corresponding to the first user are sequentially received. The electronic device 200 may insert ID information of the first user respectively into the first, third, and fifth messages, ID information of the second user into the second message, and ID information of the third user into the fourth message. The electronic device 200 may generate a voice stream by inserting ID information of a user into a corresponding message. By inserting the ID information of the user, it is possible to identify who has transmitted the message.

Referring back to FIG. 3, the electronic device 200 outputs a voice stream (S340). The user may select a voice stream to be played back from among the generated voice streams. The electronic device may output the voice stream selected by the user.

Figure 5:
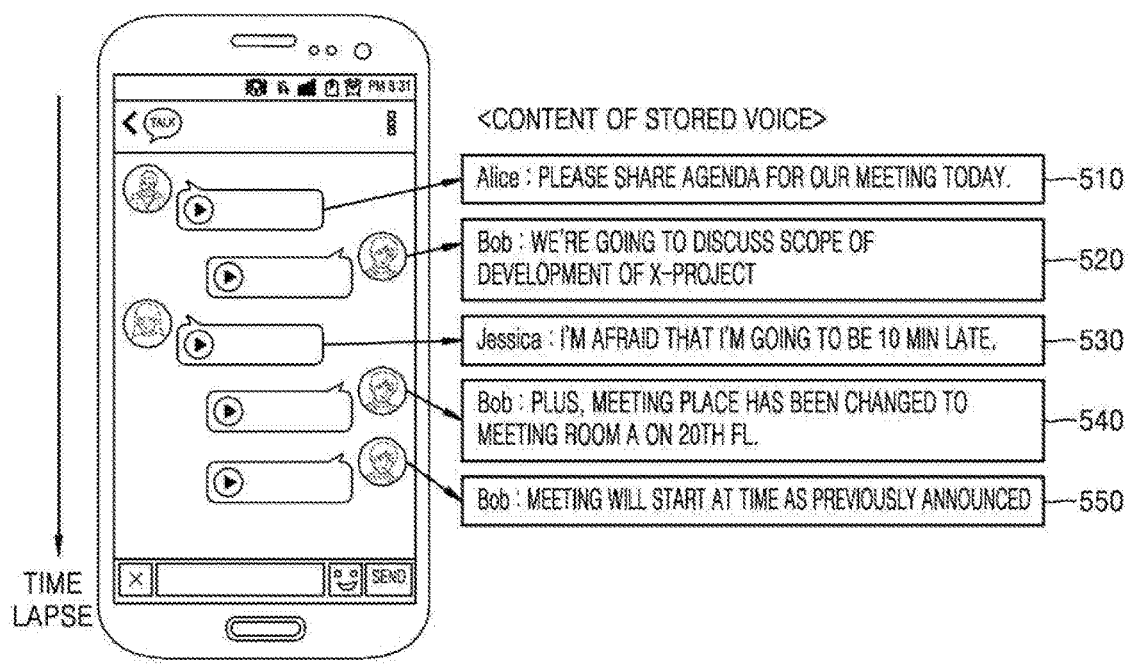
FIG. 5 illustrates explaining messages corresponding to a plurality of users, which are stored in an electronic device, according to various embodiments of the present disclosure.

FIG. 5 is a diagram for explaining messages corresponding to a plurality of users, which are stored in the electronic device 200, according to an embodiment.

The electronic device 200 may receive messages corresponding to a plurality of users and pieces of ID information of the plurality of users and store the received messages and pieces of ID information in the memory. The electronic device 200 may store, according to the time when unconfirmed messages are received, a name or ID of a user who has transmitted a message, an image of the user, and the time when the message is received, and display the same on a screen of the electronic device 200.

As shown in FIG. 5, the electronic device 200 may store messages 510, 520, 530, 540, and 550 corresponding to users (Alice, Bob, and Jessica) in a group. The messages 510, 520, 530, 540, and 550 corresponding to the users (Alice, Bob, and Jessica) in the group may be stored as voice data. Icons for playing back the voice data may be displayed on a screen of a terminal, instead of the content of corresponding messages. For example, if the user selects an icon playing back a message corresponding to Alice, which is displayed on the screen, the electronic device 200 may output a voice stream "Please share agenda for our meeting today". In other words, the user may listen to the messages 510, 520, 530, 540, and 550 corresponding to the users in the group (Alice, Bob, and Jessica) by respectively selecting the corresponding icons. Furthermore, by using a "Play All" function (not shown), the user may sequentially listen to all the messages 510, 520, 530, 540, and 550 that have accumulated, in the order in which the messages 510, 520, 530, 540, and 550 have arrived.

Figure 6:
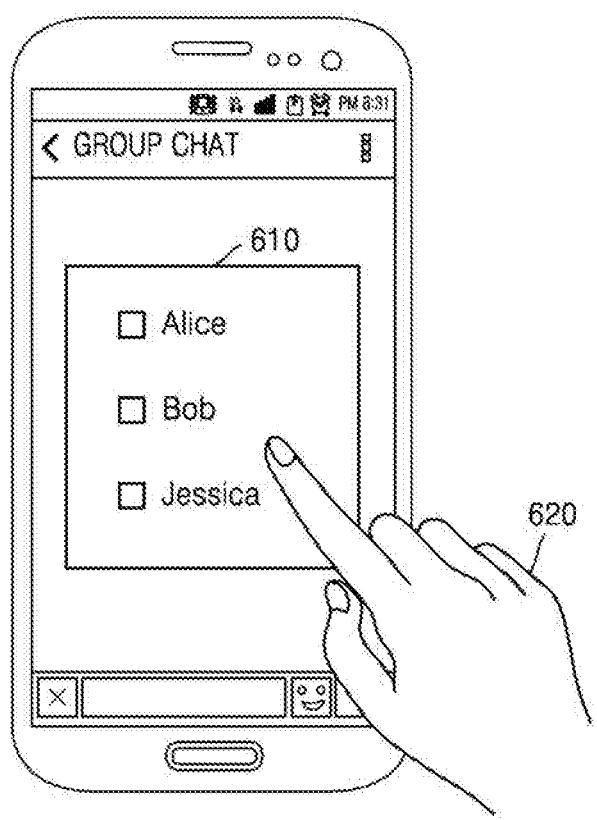
FIG. 6 illustrates a screen of an electronic device for selecting at least one user from among a plurality of users in order to reconstruct messages, according to various embodiments of the present disclosure.

FIG. 6 illustrates a screen of the electronic device 200 for selecting at least one user from among a plurality of users in order to reconstruct messages, according to an embodiment.

If a large number of messages are exchanged within a group, all conversations exchanged between a plurality of users in the group do not need to be heard depending on characteristics of the conversations, only messages corresponding to a mediator such as a leader in the group need to be confirmed, or only messages corresponding to a particular speaker need to be reconfirmed if they cannot be heard well during real-time listening of messages, the user needs to listen to only messages corresponding to some of the plurality of users in the group rather than all of them. In this case, the user may select at least one user from among the plurality of users and listen to messages transmitted by the selected at least one user as a voice stream.

As shown in FIG. 6, the electronic device 200 may display a screen for selecting at least one user from among the plurality of users. Although FIG. 6 shows that names of the plurality of users (Alice, Bob, and Jessica) are displayed on the screen (610), an image file, etc., representing the plurality of users may be displayed thereon. If the screen of the electronic device 200 is formed as a touch screen, the user may select at least one user from among the plurality of users via a touch (620).

Figure 7A:
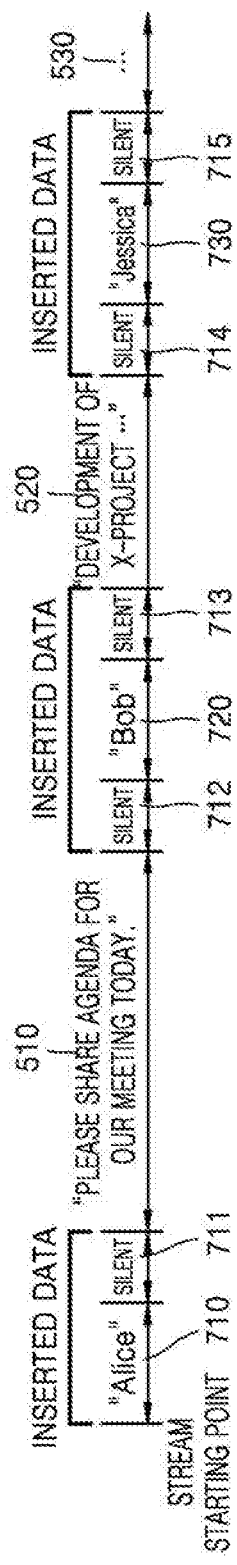
FIG. 7A illustrates a voice stream output after an electronic device reconstructs messages corresponding to a plurality of users, according to various embodiments of the present disclosure.

FIG. 7A is a diagram for explaining a voice stream output after the electronic device 200 reconstructs messages corresponding to a plurality of users, according to an embodiment.

The electronic device 200 may generate a voice stream by reconstructing all messages corresponding to a plurality of users in a group. FIG. 7A shows a voice stream generated based on the messages 510, 520, and 530 exchanged within the group shown in FIG. 5

The electronic device 200 may generate the voice stream by inserting ID information of a person who transmits a corresponding message into the message, so that the user may identify the person.

The electronic device 200 may insert voice data 710 representing "Alice" into a first message 510 in order to indicate transmission of the first message 510 by "Alice". Furthermore, the electronic device 200 may insert voice data 720 representing "Bob" into a second message 520 in order to indicate transmission of the second message 520 by "Bob". In addition, the electronic device 200 may insert voice data 730 representing "Jessica" into a third message 530 in order to indicate transmission of the third message 530 by "Jessica". Thus, the user may identify a person who transmits a message by only listening to the voice stream.

In addition, when reconstructing the first through third messages 510, 520, and 530 corresponding to the plurality of users Alice, Bob, and Jessica into a single voice stream, the electronic device 200 may generate the voice stream by inserting silent intervals 711 through 715 in order to prevent continuous connection between the first through third messages 510, 520, and 530.

Figure 7B:
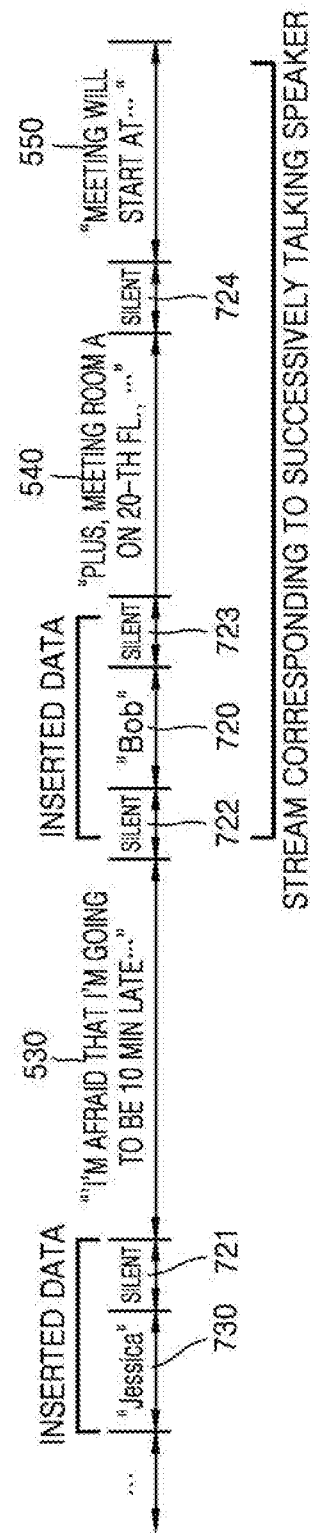
FIG. 7B illustrates a voice stream output after an electronic device reconstructs messages corresponding to a plurality of users, according to various embodiments of the present disclosure.

FIG. 7B is a diagram for explaining a voice stream output after the electronic device 200 reconstructs messages corresponding to a plurality of users, according to an embodiment.

When reconstructing messages corresponding to a user, the electronic device 200 may determine, if there is no message corresponding to another user between messages corresponding to the same user, the messages corresponding to the same user as successive messages.

The electronic device 200 may generate a voice stream by inserting ID information of a user into a starting message among the successive messages. In this case, the electronic device 200 may not insert ID information of the user into the other successive messages from a message immediately following the starting message to a last message.

As shown in FIG. 7B, fourth and fifth messages 540 and 550 are successive messages that are to be transmitted by "Bob". The electronic device 200 may insert voice data 720 representing "Bob" only at the front of the fourth message 540. Furthermore, when reconstructing the plurality of messages corresponding to a plurality of users Alice, Bob, and Jessica into a single voice stream, the electronic device 200 may generate a voice stream by inserting silent intervals 721 through 724 in order to prevent continuous connection between the third through fifth messages 530, 540, and 550.

Figure 8A:
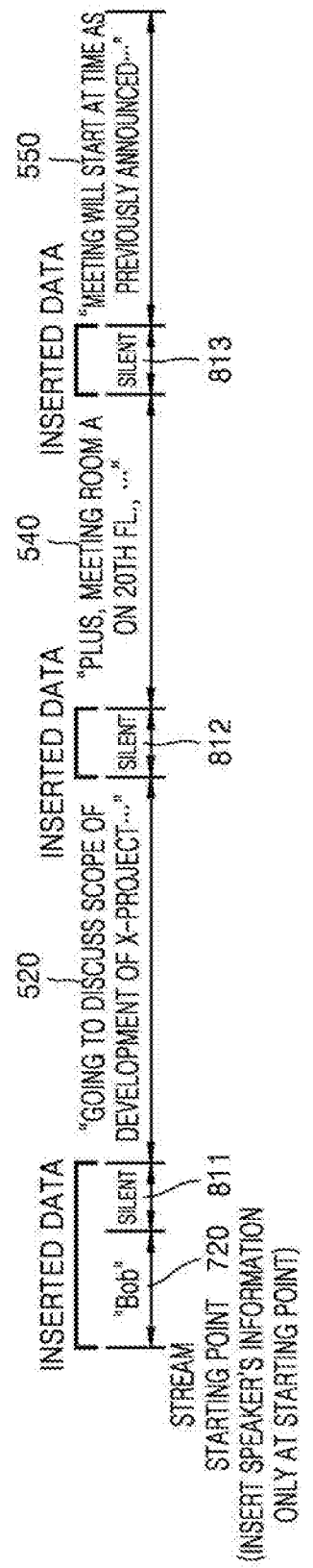
FIG. 8A illustrates a voice stream output after an electronic device reconstructs messages corresponding to a user selected from among a plurality of users, according to various embodiments of the present disclosure.

FIG. 8A is a diagram for explaining a voice stream output after the electronic device 200 reconstructs messages corresponding to a user selected from among a plurality of users, according to an embodiment.

The electronic device 200 may generate a voice stream by reconstructing messages corresponding to some of a plurality of users in a group. In particular, FIG. 8A illustrates a voice stream generated based on messages corresponding to "Bob" selected from among the plurality of users Alice, Bob, and Jessica in the group shown in FIG. 5. The electronic device 200 may reconstruct some messages exchanged within the group into a single voice stream.

The electronic device 200 may extract the second, fourth, and fifth messages 520, 540, and 550 among the first through fifth messages 510, 520, 530, 540, and 550 corresponding to the plurality of users Alice, Bob, and Jessica. Furthermore, the electronic device 200 may extract ID information of "Bob" among pieces of ID information of the plurality of users Alice, Bob, and Jessica.

When reconstructing the second, fourth, and fifth messages 520, 540, and 550 corresponding to "Bob" into a voice stream, the electronic device 200 may insert silent intervals 812 and 813 respectively in order to prevent continuous connections between the second and fourth messages 520 and 540 and between the fourth and fifth messages 540 and 550.

Furthermore, the electronic device 200 may insert voice data 720 representing "Bob" at the front of the second message 520 in order to indicate that "Bob" transmits the second, fourth, and fifth messages 520, 540, and 550. The electronic device 200 may insert a silent interval 811 in order to prevent continuous connection between the voice data 720 and the second message 520.

Figure 8B:
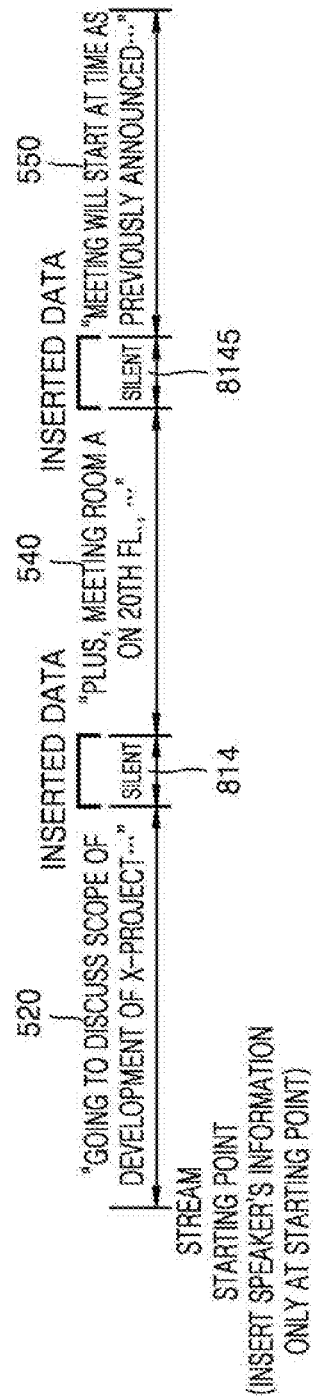
FIG. 8B illustrates a voice stream output after an electronic device reconstructs messages corresponding to a user selected from among a plurality of users, according to various embodiments of the present disclosure.

FIG. 8B is a diagram for explaining a voice stream output after the electronic device 200 reconstructs messages corresponding to a user selected from among a plurality of users, according to another embodiment.

If an a voice stream is generated based on only messages corresponding to a first user from among a plurality of users, the electronic device 200 may generate a voice stream based on the messages corresponding to the first user without inserting ID information of the first user.

As shown in FIG. 8B, the electronic device 200 may generate a voice stream by inserting silent intervals 814 and 815 respectively between the second and fourth messages 520 and 540 and between the fourth and fifth messages 540 and 550 without inserting the voice data 720 representing "Bob" at the front of the second message 520.

Figure 9A:
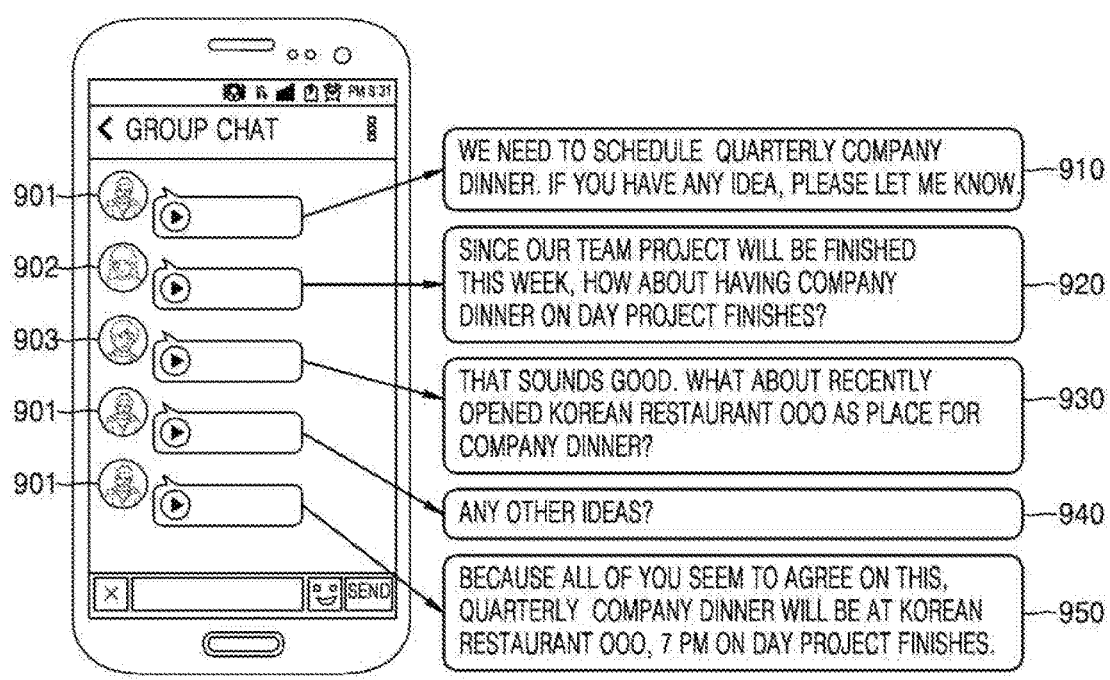
FIG. 9A illustrates explaining messages, which are stored in an electronic device and correspond to a plurality of users, according to various embodiments of the present disclosure.

FIG. 9A is a diagram for explaining messages corresponding to a plurality of users, which are stored in the electronic device 200, according to another embodiment.

The electronic device 200 may receive messages corresponding to a plurality of users and pieces of ID information of the plurality of users and store the same in the memory of the electronic device 200. As shown in FIG. 9A, the electronic device 200 may store messages 910, 920, 930, 940, and 950 corresponding to first through third users 901 through 903 in a group.

The messages 910, 920, 930, 940, and 950 corresponding to the first through third users 901 through 903 in the group may be stored as voice data. Icons playing back the voice data may be displayed on a screen of a terminal, instead of the content of corresponding messages. For example, if the user selects an icon playing back a message corresponding to the second user 902, which is displayed on the screen, the electronic device 200 may output a voice stream "Since our team project will be finished this week, how about having a company dinner on the day the project finishes?"

Figure 9B:
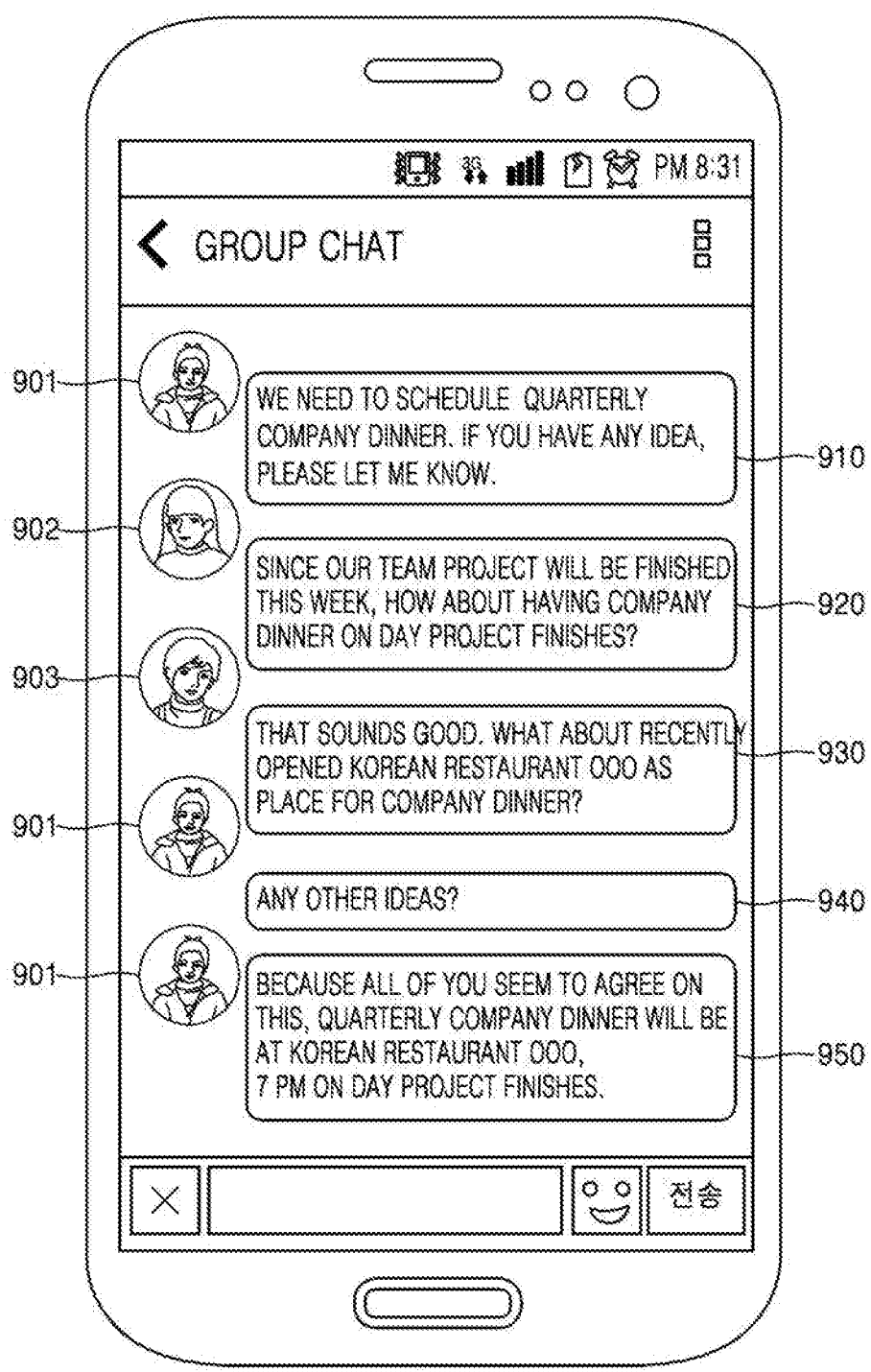
FIG. 9B illustrates explaining messages, which are stored in an electronic device and correspond to a plurality of users, according to various embodiments of the present disclosure.

FIG. 9B is a diagram for explaining messages corresponding to a plurality of users, which are stored in the electronic device 200, according to another embodiment.

As shown in FIG. 9B, the electronic device 200 may store messages 910, 920, 930, 940, and 950 corresponding to users 901 through 903 in a group as text data. The electronic device 200 may convert the messages 910, 920, 930, 940, and 950 that are in the form of text data into voice data. The electronic device 200 may generate a voice stream based on the voice data.

Figure 10A:
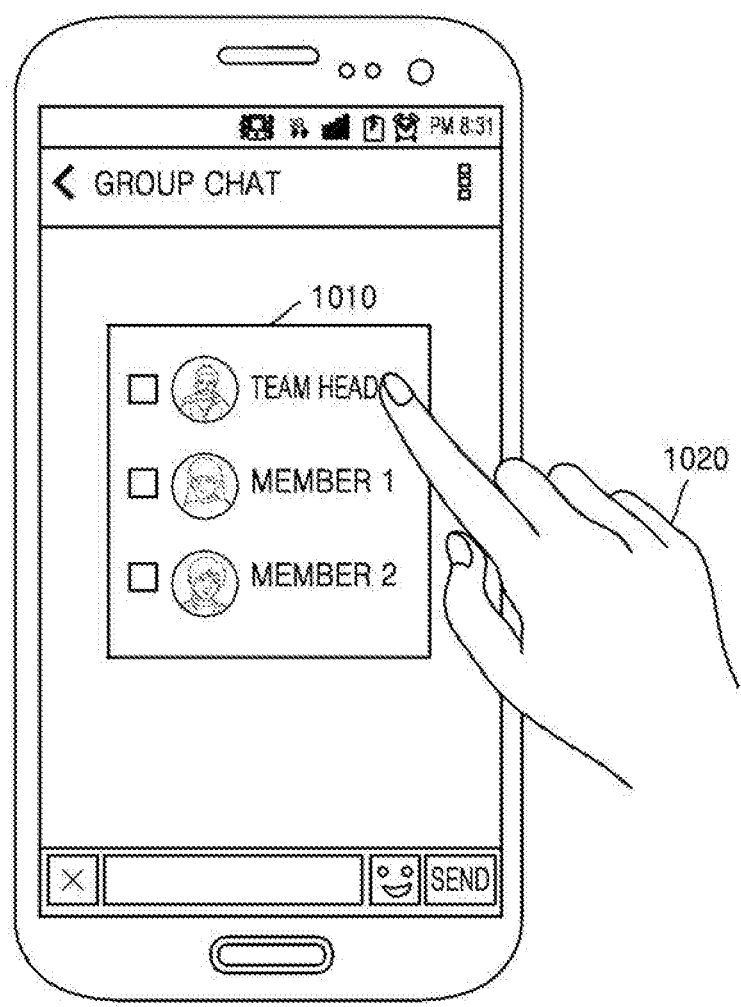
FIG. 10A illustrates a screen of an electronic device on which a user selects at least one user from among a plurality of users in order to reconstruct messages, according to various embodiments of the present disclosure.

FIG. 10A illustrates a screen of the electronic device 200 on which a user selects at least one user from among a plurality of users in order to reconstruct messages, according to another embodiment.

As shown in FIG. 10A, the electronic device 200 may display a screen for selecting at least one user from among a plurality of users (1010). The screen of the electronic device 200 may be formed as a touch screen, and the user may select at least one user from among the plurality of users via a touch (1020).

To select at least one user from among the plurality of users, the screen of the electronic device 200 may be used as shown in FIG. 10A. Alternatively, at least one user may be selected from among the plurality of users via a voice recognition module of the electronic device 200.

Figure 10B:
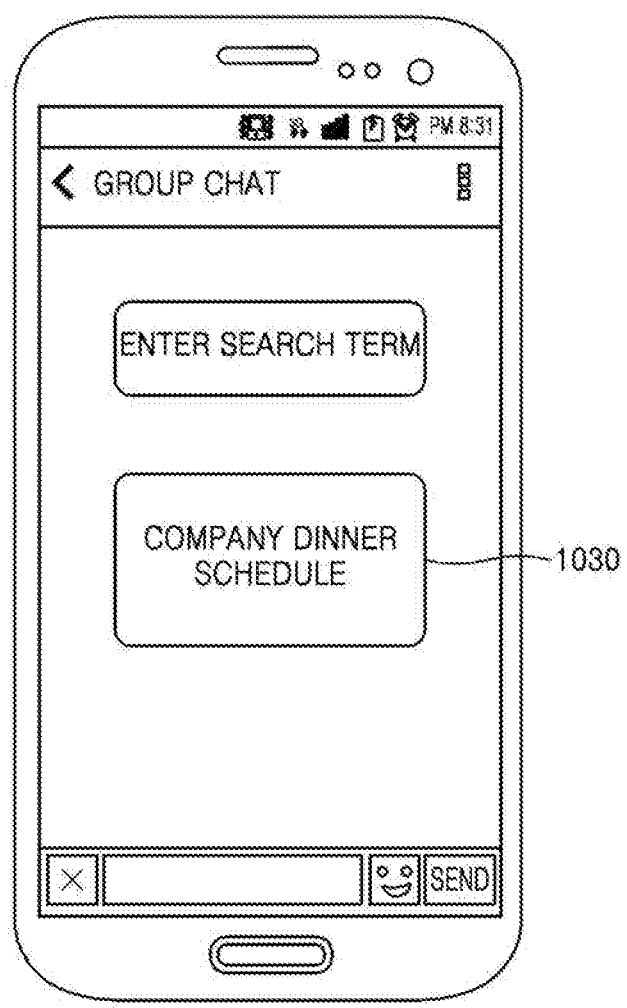
FIG. 10B illustrates a screen of an electronic device, via which a search term is entered in order to reconstruct messages by using the search term, according to various embodiments of the present disclosure.

FIG. 10B illustrates a screen of the electronic device 200, via which a search term is entered in order to reconstruct messages by using the search term, according to an embodiment.

The electronic device 200 may acquire a search term. The search term may be a keyword for which a user desires to search among messages exchanged within a group. The search term may be acquired via a user interface of the electronic device 200. As shown in FIG. 10B, the electronic device 200 may display a search term entry window on the screen. The user may enter a "company dinner schedule" via the search term entry window (1030).

The electronic device 200 may generate a voice stream based on a search term and messages corresponding to a plurality of users. Furthermore, the electronic device 200 may generate a voice stream based on a search term and a message corresponding to at least one user selected from among the plurality of users.

FIG. 11A is a diagram for explaining a voice stream output from the electronic device 200 according to another embodiment;

As shown in FIGS. 9A, 9B, and 11A, the electronic device 200 may acquire a signal for selecting a team head 901 from among the plurality of users 901 through 903. The electronic device 200 may extract the messages 910, 940, and 950 corresponding to the team head 901 among the messages 910, 920, 930, 940, and 950 corresponding to the plurality of users 901 through 903. Furthermore, the electronic device 200 may extract ID information of the team head 901 among pieces of ID information of the plurality of users 901 through 903.

The electronic device 200 may insert the ID information of the team head 901 at the front of the first message 910. Furthermore, the electronic device 200 may generate a voice stream by inserting silent intervals 1112 and 1113 respectively in order to prevent continuous connections between the first and fourth messages 910 and 940 and between the fourth and fifth messages 940 and 950. Furthermore, the electronic device 200 may insert a silent interval 1111 between the ID information of the team head 901 and the first message 910.

FIG. 11B is a diagram for explaining a voice stream output from the electronic device 200 according to another embodiment.

The electronic device 200 may generate a voice stream based on a search term and a message corresponding to selected at least one user. As shown in FIG. 11B, the electronic device 200 may generate a voice stream based on a search term "company dinner schedule". In detail, the electronic device 200 may generate a voice stream by extracting messages 910 and 950 related to the "company dinner schedule" among messages 910, 940, and 950 that are transmitted by a team head 901.

Figure 12:
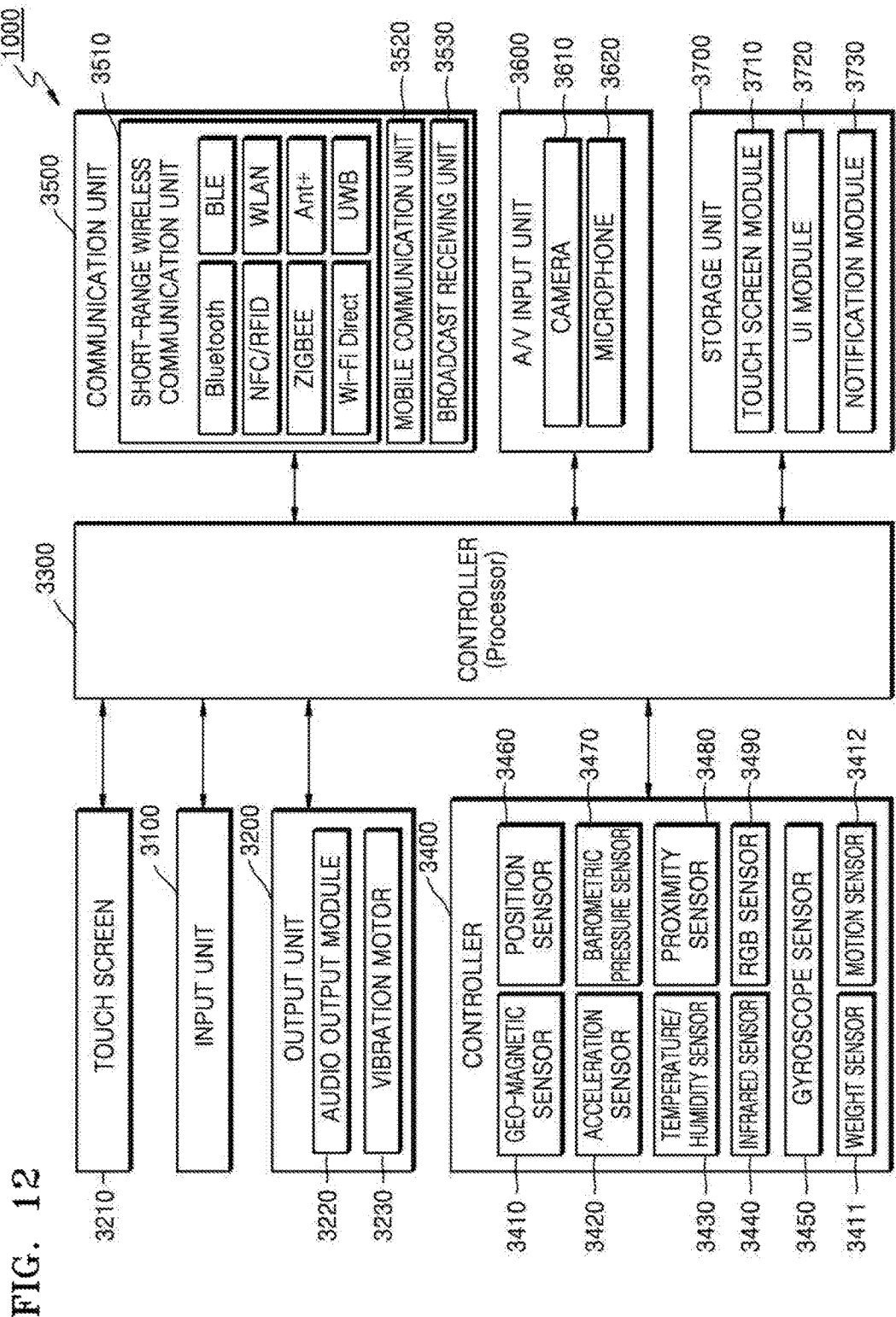
FIG. 12 illustrates a configuration of an electronic device that is a terminal, according to various embodiments of the present disclosure.

FIG. 12 is a block diagram of a configuration of an electronic device 1000 that is a terminal according to an embodiment.

The electronic device 1000 of FIG. 12 may correspond to the electronic device 200 of FIG. 2. In detail, a controller 3300, an output unit 3200, a communication unit 3500, a storage unit 3700, and an input unit 3100 shown in FIG. 12 may respectively correspond to the controller 210, the output unit 220, the communication unit, the memory, and the user interface described with reference to FIG. 2.

The input unit 3100 is a device via which the user inputs data necessary for controlling the electronic device 1000. Examples of the input unit 3100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The output unit 3200 may output an audio signal, a video signal, or a vibration signal. The output unit 3200 may include an audio output module 3220 and a vibration motor 3230.

A touch screen 3210 may include at least one of a liquid crystal display (LCD), a thin film transistor-LCD (TFT LCD), an organic light-emitting diode (OLED) display, a flexible display, a three-dimensional (3D) display, and an electrophoretic display. The electronic device 1000 may also include two or more touch screens 3210 according to its implemented configuration. In this case, the two or more touch screens 3210 may be disposed opposite each other via a hinge.

The audio output module 3220 may output audio data received from the communication unit 3500 or stored in the storage unit 3700. The audio output module 3220 may also output sound signals associated with functions of the electronic device 1000 (e.g., a call signal reception sound, a message reception sound, and a notification sound). The audio output module 3220 may include a speaker, a buzzer, etc.

The vibration motor 3230 may output a vibration signal. For example, the vibration motor 3230 may output a vibration signal corresponding to an output of audio data or video data (e.g., a call signal reception sound, a message reception sound, etc.). Furthermore, the vibration motor 3230 may output a vibration signal when a touch is input to the touch screen 3210.

The controller 3300 controls overall operations of the electronic device 1000. For example, the controller 3300 may control components of the electronic device 1000 to operate by executing programs stored in the storage unit 3700.

The sensing unit 3400 may detect a user's physical contact and acquire biological information based on the detected user's physical contact. The sensing unit 3400 may include at least one of a geo-magnetic sensor 3410, a weight sensor 3411, a motion sensor 3412, an acceleration sensor 3420, a temperature/humidity sensor 3430, an infrared sensor 3440, a gyroscope sensor 3450, a position sensor 3460, a barometric pressure sensor 3470, a proximity sensor 3480, and a red, green, and blue (RGB) sensor 3490, but is not limited thereto. Since functions of the above-descried sensors may be inferred intuitively by those of ordinary skill in the art, detailed descriptions thereof will be omitted below.

The communication unit 3500 may include one or more components that enable communications between the electronic device 1000 and an external device (not shown). For example, the communication unit 3500 may include a short-range wireless communication unit 3510, a mobile communication unit 3520, and a broadcast receiving unit 3530.

The short-range wireless communication unit 3510 may include a BLUETOOTH communication module, a BLE communication module, an NFC module, a WLAN communication module, a ZIGBEE communication module, an IrDA communication module, a WFD communication module, a UWB communication module, and an ANT+ communication module, but is not limited thereto.

The mobile communication unit 3520 transmits or receives a wireless signal to or from at least one of a base station, an external electronic device, and a server in a mobile communication network. In this case, the wireless signal may be a voice call signal, a video call signal, or data in any one of various formats according to transmission and reception of a text/multimedia message.

The broadcast receiving unit 3530 receives broadcast signals and/or broadcast-related information from the outside via a broadcast channel. The broadcast channel may include a satellite channel, a terrestrial channel, etc. According to an embodiment, the electronic device 1000 may not include the broadcast receiving unit 3530.

The audio/video (A/V) input unit 3600 is a unit for inputting an audio or video signal and may include a camera 3610 and a microphone 3620. The camera 3610 may obtain image frames such as still images or moving images via an image sensor in a video call mode or a capture mode. Images captured via the image sensor may be processed via the controller 3300 or a separate image processor (not shown).

Image frames processed by the camera 3610 may be stored in the storage unit 3700 or be transmitted to the outside via the communication unit 3500. The electronic device 1000 may include two or more cameras 3610 according to its configuration.

The microphone 3620 may receive an external audio signal and convert the received external audio signal into electrical audio data. For example, the microphone 3620 may receive an audio signal from an external device or a speaking person. The microphone 3620 may use various denoising algorithms for removing noise generated during reception of an external audio signal.

The storage unit 3700 may store programs necessary for processing or control operations performed by the controller 3300 or store data input to or output from the electronic device 1000.

The storage unit 3700 may include at least one storage medium from among a flash memory-type memory, a hard disk-type memory, a multimedia card micro-type memory, card-type memories (e.g., an SD card, an XD memory, and the like), RAM, SRAM, ROM, EEPROM, PROM, magnetic memory, a magnetic disc, and an optical disc.

The programs stored in the storage unit 3700 may be classified into a plurality of modules according to their functions. For example, the programs may be classified into a touch screen module 3710, a user interface (UI) module 3720, and a notification module 3730.

In regard to the touch screen module 3710, various sensors may be disposed within or near a touch screen so as to sense a touch or a proximity touch on the touch screen. Examples of a user's touch gesture may include a tap, touch & hold, double-tap, drag, panning, flick, drag and drop, and swipe.

The UI module 3720 may provide a specialized UI, a graphic UI (GUI), etc. interworking with the mobile device for each application. The touch screen module 3710 may detect a user's touch gesture on a touch screen and transmit information about the detected touch gesture to the controller 3300. According to some embodiments, the touch screen module 3710 may recognize a touch code for analysis. The touch screen module 3710 may be formed by separate hardware components including a controller.

The notification module 3730 may generate a signal for notifying occurrence of an event in the electronic device 100. Examples of the event that occurs in the electronic device 1000 may include call signal reception, message reception, a key signal input, a schedule notification, etc. The notification module 3730 may output a notification signal in a form of a video signal via the touch screen 3210, in a form of an audio signal via the audio output module 3220, or in a form of a vibration signal via the vibration motor 3230.

The electronic devices described above may be implemented using hardware components, software components, and/or a combination thereof. For example, the apparatuses and components illustrated in the embodiments may be implemented using one or more general-purpose or special-purpose computers, such as a processor, a controller, an arithmetic logic unit (ALU), a digital signal processor, a microcomputer, a field programmable array (FPA), a programmable logic unit (PLU), a microprocessor, or any other device capable of responding to and executing instructions.

A processing device may run an operating system (OS) and one or more software applications running on the OS. The processing device also may access, store, manipulate, process, and create data in response to execution of software.

Although a single processing device may be illustrated for convenience, one of ordinary skill in the art will appreciate that a processing device may include a plurality of processing elements and/or a plurality of types of processing elements. For example, a processing device may include a plurality of processors or a processor and a controller. In addition, the processing device may have different processing configurations such as parallel processors.

Software may include a computer program, a piece of code, an instruction, or one or more combinations thereof and independently or collectively instruct or configure the processing device to operate as desired.

Software and/or data may be embodied permanently or temporarily in any type of machine, component, physical equipment, virtual equipment, computer storage medium or device, or in a transmitted signal wave so as to be interpreted by the processing device or to provide instructions or data to the processing device. The software also may be distributed over network-coupled computer systems so that the software is stored and executed in a distributed fashion. In particular, the software and data may be stored in one or more non-transitory computer-readable recording media.

The methods according to the embodiments may be recorded in non-transitory computer-readable recording media including program instructions to implement various operations embodied by a computer. The non-transitory computer-readable recording media may also include, alone or in combination with the program instructions, data files, data structures, and the like. The program instructions recorded on the non-transitory computer-readable recording media may be designed and configured specially for the embodiments or be known and available to those of ordinary skill in computer software.

Examples of non-transitory computer-readable recording media include magnetic media such as hard disks, floppy disks, and magnetic tape, optical media such as CD-ROM discs and DVDs, magneto-optical media such as floptical discs, and hardware devices that are specially configured to store and perform program instructions, such as ROM, RAM, flash memory, and the like.

Examples of program instructions include both machine code, such as that produced by a compiler, and higher level code that may be executed by the computer using an interpreter.

The above-described hardware devices may be configured to act as one or more software modules in order to perform the operations of the above-described embodiments, or vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing a message via an electronic device, the method comprising:
   executing an application that provides messages, which correspond to a plurality of users in a group, as a voice;
   acquiring a signal for selecting at least one user from the group;
   generating a voice stream by reconstructing at least one message corresponding to the at least one user based on the acquired signal and the messages corresponding to the plurality of users; and
   outputting the voice stream,
   wherein the generating the voice stream comprises, when the at least one message corresponding to the at least one user is a plurality of messages, generating the voice stream by inserting a silent interval between the plurality of messages; and when the at least one message corresponding to the at least one user comprises successive messages, inserting ID information of the at least one user into a starting message from among the successive messages, extracting at least one message containing a keyword from among the messages corresponding to the plurality of users, and generating the voice stream by reconstructing the extracted at least one message.

2. The method of claim 1, wherein generating the voice stream comprises:
extracting the at least one message corresponding to the at least one user among the messages corresponding to the plurality of users;
extracting identification (ID) information of the at least one user among pieces of ID information of the plurality of users; and
generating the voice stream by inserting the ID information of the at least one user into the at least one message corresponding to the at least one user.

3. The method of claim 2, further comprising receiving the messages corresponding to the plurality of users and the pieces of ID information of the plurality of users,
wherein the pieces of ID information of the plurality of users are pieces of information respectively indicating names or IDs of the plurality of users.

4. The method of claim 2, wherein the at least one message corresponding to the at least one user is acquired within a predetermined time interval.

5. The method of claim 4, wherein the predetermined time interval is at least one of a time interval from an end time point when execution of the application ends to a start time point when the execution of the application starts after the end time point and a time interval corresponding to unconfirmed messages from among the messages corresponding to the plurality of users.

6. The method of claim 2, wherein a type of the at least one message corresponding to the at least one user and the ID information of the at least one user is at least one of text data and voice data, and
the method further comprising, when the type of the at least one message corresponding to the at least one user and the ID information of the at least one user is the text data, converting the text data into the voice data.

7. The method of claim 1, further comprising acquiring a search term,
wherein generating the voice stream comprises generating the voice stream by reconstructing the at least one message corresponding to the at least one user based on the signal, the acquired search term, and the messages corresponding to the plurality of users.

8. The method of claim 3, further comprising storing the messages corresponding to the plurality of users and the pieces of ID information of the plurality of users.

9. The method of claim 1, wherein acquiring the signal for selecting the at least one user from the group comprises acquiring the signal for selecting the at least one user via a user interface of the electronic device.

10. An electronic device comprising:
a controller configured to:
execute an application that provides messages, which correspond to a plurality of users in a group, as a voice, and
generate a voice stream by reconstructing at least one message corresponding to at least one user based on a signal for selecting the at least one user from the group and the messages corresponding to the plurality of users; and
an output unit configured to output the generated voice stream,
wherein generating the voice stream comprises, when the at least one message corresponding to the at least one user is a plurality of messages, generating the voice stream by inserting a silent interval between the plurality of messages, and when the at least one message corresponding to the at least one user comprises successive messages, inserting ID information of the at least one user and the silent interval into each of the plurality of messages, extracting at least one message containing a keyword from among the messages corresponding to the plurality of users, and generating the voice stream by reconstructing the extracted at least one message.

11. The electronic device of claim 10, wherein the controller is further configured to:
extract the at least one message corresponding to the at least one user among the messages corresponding to the plurality of users,
extract identification (ID) information of the at least one user among pieces of ID information of the plurality of users, and
generate the voice stream by inserting the ID information of the at least one user into the at least one message corresponding to the at least one user.

12. The electronic device of claim 11, further comprising a communication unit configured to receive the messages corresponding to the plurality of users and the pieces of ID information of the plurality of users,
wherein the pieces of ID information of the plurality of users are pieces of information respectively indicating names or IDs of the plurality of users.

13. The electronic device of claim 11, wherein a type of the at least one message corresponding to the at least one user and the ID information of the at least one user is at least one of text data and voice data, and
wherein, when the type of the at least one message corresponding to the at least one user and the ID information of the at least one user is the text data, the controller is further configured to convert the text data into the voice data.

14. The electronic device of claim 10, wherein the controller is further configured to acquire a search term and generate the voice stream by reconstructing the at least one message corresponding to the at least one user based on the signal, the acquired search term, and the messages corresponding to the plurality of users.

15. The electronic device of claim 12, further comprising:
a memory configured to store the messages corresponding to the plurality of users and the pieces of ID information of the plurality of users; and
a user interface configured to acquire the signal for selecting the at least one user.

16. A non-transitory computer-readable recording medium having recorded thereon a program for executing a method of providing a message via an electronic device on a computer, the method comprising:
executing an application that provides messages, which correspond to a plurality of users in a group, as a voice;
acquiring a signal for selecting at least one user from the group;
generating a voice stream by reconstructing at least one message corresponding to the at least one user based on the acquired signal and the messages corresponding to the plurality of users; and
outputting the voice stream, wherein the generating the voice stream comprises, when the at least one message corresponding to the at least one user is a plurality of messages, generating the voice stream by inserting a silent interval between the plurality of messages, when the at least one message corresponding to the at least one user comprises successive messages, inserting ID information of the at least one user and the silent interval into each of the plurality of messages, extracting at least one message containing a keyword from among the messages corresponding to the plurality of users, and generating the voice stream by reconstructing the extracted at least one message.

* * * * *